2,917,556

PROCESS FOR SEPARATING VINYLIDENE FLUORIDE FROM VINYL FLUORIDE

William C. Percival, Wilmington, Del., assignor to E. I. du Pont de Nemours and Company, Wilmington, Del., a corporation of Delaware No Drawing. Application June 9, 1958
Serial No. 740,557

3 Claims. (Cl. 260—653.3)

This invention is directed to a novel process for purifying vinylidene fluoride. In particular, the present invention is concerned with a process of separating vinyl fluoride from its admixture with vinylidene fluoride whereby pure vinylidene fluoride is obtained. Vinylidene fluoride is useful as an intermediate in the preparation of polymers, such as polyvinylidene fluoride or as a comonomer with hexafluoropropylene to yield the thermally stable elastomer described by Dixon, Rexford and Rugg in Ind. and Eng. Chemistry, October 1957.

Vinylidene fluoride is prepared under pyrolytic conditions from ethylidene fluoride and chlorine; see, for example, U.S.P. 2,722,558. The product obtained may contain various amounts of vinyl fluoride. Small amounts of other gases, such as acetylene, are also formed during the preparation, and, the vinylidene fluoride product contains small amounts of these gaseous products. In order to obtain pure vinylidene fluoride for ultimate use it is necessary to purify it and remove the unwanted by-product gases.

It is an object of the present invention to separate vinylidene fluoride from its admixture with vinyl fluoride to obtain substantially 100% yield effluent of vinylidene fluoride.

These and other objects will become apparent in the following description and claims.

Vinyl fluoride and vinylidene fluoride have very low boiling points (below $-70°$ C.). It is obvious that distillation methods would be both expensive and impractical as a means to separate these materials on a commercial scale. Because of their chemical similarity, chemical means of separation also appear as an unlikely possibility. It is desirable to obtain a simple adsorption technique for separating vinyl fluoride from its admixture with vinylidene fluoride. This is particularly desirable because the process for preparing vinylidene fluoride yields gaseous products and it would merely be necessary to pass these products through an adsorbent which preferentially adsorbs one or the other of the gases and make the separation desired. Preferably, of course, the vinyl fluoride should be absorbed since pure vinylidene fluoride is desired and this product gas should be the effluent. It has been found that common adsorbents such as silica gel, alumina and activated carbon do make a preferential adsorption of vinyl fluoride from its admixture with vinylidene fluoride; however, the capacity of these agents is so limited that a commercial process based on their use is not feasible.

Recently, new types of adsorbents have become available. These are known as molecular sieves and separate liquid and gaseous materials on the basis of a difference in molecular size. These molecular sieves are manufactured and sold by the Linde Air Products Co., a division of Union Carbide and Carbon Corp. They are known and recommended to separate saturated molecules from unsaturated compounds. Because vinyl fluoride and vinylidene fluoride are both ethylenic compounds and do not differ significantly in molecular size it is unexpected that such molecular sieves would separate a mixture of vinyl fluoride and vinylidene fluoride.

It has now been discovered that vinyl fluoride may be separated from its admixture with vinylidene fluoride by passing the gaseous mixture through a bed of alkali metal alumina silicates; surprisingly, it has been found that by means of these agents, known commercially as Linde Air Products Co. molecular sieves No. 5–A, No. 10–X and No. 13–X, it is possible to pass a mixture of vinyl fluoride and vinylidene fluoride through them and obtain an effluent consisting of 100% vinylidene fluoride.

More specifically, the present invention is directed to a process of separating vinylidene fluoride from its admixture with vinyl fluoride wherein the vinyl fluoride concentration of said mixture is less than about 30 molar percent, which comprises passing the mixture of gases through a synthetic alkali metal alumina silicate characterized by a three-dimensional network with mutually connected intracrystalline voids accessible through openings at least 5 A. in diameter, said process being carried out below $80°$ C. and below 600 p.s.i.g.

Both vinyl fluoride and vinylidene fluoride are small molecules and according to Griffin and Tatlock molecular structure models have molecular diameters of about 4.2 A. x 5.2 A. for vinyl fluoride and 5.0 A. x 5.2 A. for vinylidene fluoride. Experiments show that vinylidene fluoride as well as vinyl fluoride are each adsorbed on molecular sieves 5–A, 10–X and 13–X. Accordingly, it was expected that both gases would be highly adsorbed on these molecular sieves and that a clean separation could not be obtained. It is indeed surprising to find that molecular sieves 5–A, 10–X and 13–X which admit molecules having critical diameters as large as 5 A., 10 A., and 13 A., respectively, will preferentially adsorb vinyl fluoride and let vinylidene fluoride pass.

The adsorbents used in the process of the present invention, that is, molecular sieves, are alkali metal alumina silicates quite similar to many natural zeolites, clays and feldspars. In the case of the molecular sieves, however, when water is driven off, the crystal does not collapse or rearrange as is the case with most other hydrated materials. With molecular sieves, the physical structure remains unchanged and this results in a network of empty pores and cavities. These empty pores and cavities comprise about one-half of the total volume of the crystals. The adsorbents used for the process of this invention are those molecular sieves characterized by three-dimensional network with mutually connected intra-crystalline voids accessible through openings of at least 5 A. in diameter; that is, they have a pore diameter of at least 5 A. These materials are available as molecular sieves 5–A, 10–X, and 13–X. Molecular sieve 5–A has intra-crystalline voids of 5 A. diameter, sieve 10–X has voids of 10 A. and sieve 13–X has voids of 13 A. diameter. The void volume of these agents is about 50% of the silicate and all adsorption takes place in the crystalline voids. These molecular sieves are available as pellets $1/16''$ or $1/8''$ in size. The pellets are held together with binding material amounting to about 20% of the total weight. As indicated, these materials are available from Linde Air Products Co., a division of Union Carbide and Carbon Corp.

The process of this invention is carried out by placing the molecular sieve adsorbent in a container, usually cylindrical, and feeding the mixture of gases into one end. Usually the cylindrical container is in a vertical position and the input of gases is fed at the bottom of the cylinder. The gas emerging from the top of the cylinder is free of vinyl fluoride, and is the product vinylidene fluoride gas. Since molecular sieves can be regenerated, commercial operation will preferably be carried out with two adsorbers, operating in parallel. One will be operating in the purifying cycle removing vinyl fluoride from its admixture with vinylidene fluoride and the second adsorber will be undergoing a regeneration cycle. In the regeneration step the adsorber will be vented to atmospheric pressure, evacuated and heated to about 200° C. The high temperature desorbs the sorbed gases and renews the capacity of the unit for further use. An alternate and preferred method of regeneration is to desorb the adsorbed gases by filling the bed with water at room temperature. After the gases are desorbed, as seen by cessation of bubbling, the water is drained and the bed dried by passing an inert gas through the bed. Usually nitrogen or air will be used and these drying gases will be heated to about 250° C.

It will be understood that as the gaseous mixture is fed through the absorber both vinyl fluoride and vinylidene fluoride are adsorbed. However, the preferential adsorption of vinyl fluoride is so much greater that the effluent gas is free of it, until, of course, the molecular sieve is saturated and break-through occurs. It is desirable that the desorbed gases from the regeneration step also be passed through the molecular sieve to recover the vinylidene fluoride it contains.

The composition of the feed material will be primarily vinylidene fluoride and will normally contain about 0.1 to 5 mole percent of vinyl fluoride, but up to about 30 mole percent of vinyl fluoride in the gas can be removed by this process. Small amounts of other materials, particularly acetylene, may also be present, and the molecular sieves used in this process are particularly advantageous in that they also adsorb acetylene and remove it from the feed gas mixture. The molecular sieves function in that the vinyl fluoride and acetylene are adsorbed preferentially and the effluent gas is free of these contaminants. As indicated, a point is reached when the capacity of the molecular sieve is exceeded and vinyl fluoride begins to come through. This can be determined very simply by chromatographic analysis of the effluent which is periodically checked.

The temperature at which the process is carried out is not critical, but it has been observed that lower temperatures are somewhat advantageous. Normally, temperatures at or below room temperature will be used, but temperatures between 0 and −10° show an increased capacity of about 60% over that obtained at 20° C. It will be necessary to balance the advantage of increased capacity over the disadvantage of a refrigeration system to determine the most efficient temperature of operation. As temperatures increase much above 80° C., however, desorption takes place and capacity is reduced; thus, operating temperatures will normally be below about 80° C.

The process may be operated over a wide range of pressures. Normally pressures slightly above atmospheric will be used, but no particular effort will be made for pressure control. At pressures above 600 p.s.i.g. the gases may condense at operating temperatures and therefore pressures lower than this should be used.

The throughput of the gaseous mixture should be such that a superficial gas velocity of greater than about 2 ft. per second is not exceeded. If this velocity is greatly exceeded, the flow of gases will be so rapid that the vinyl fluoride will not have sufficient residence time to be adsorbed. This required gas velocity is a function of the molecular sieves and is easily accomplished.

Representative examples illustrating the present invention are as follows:

Example 1

A column, 1.6 inches inside diameter by 36 inches tall was packed with 750 grams of molecular sieve 13–X. The molecular sieve was in the form of pellets $1/16$ inch in diameter by approximately $1/4$ inch long. The sieves which had been previously used were then reactivated by heating them to a maximum temperature of 200° C. while at the same time purging them with helium. The helium purge was continued until all traces of vinyl fluoride and vinylidene fluoride, which had been adsorbed on the sieves during previous runs, were removed. This was determined by a chromatographic analysis of the effluent helium. After complete removal of these materials, the column was cooled to room temperature and it was ready for the next run. Then a feed mixture containing 6.4 mole percent of vinyl fluoride and 93.6 mole percent of vinylidene fluoride was drawn vapor phase from a weighed feed cylinder, metered and fed to the bottom of the adsorber bed. The heat of adsorption caused the sieve temperature to rise to a maximum of about 80° C. within a few minutes after the start of the run, after which the temperature dropped as heat was lost from the system. The superficial gas velocity was about 0.167 feet/second in the adsorber and the pressure at the inlet end was about 200 mm. Hg gauge.

The effluent gas from the top of the column was pure vinylidene fluoride and remained pure until the sieves were saturated at which point vinyl fluoride began to appear in the effluent. This occurred 48 minutes after the start of the run. The vinyl fluoride content of the effluent gas was determined chromatographically. After the vinyl fluoride had broken through, the feed was stopped, and the column reactivated as described above.

Example 2

The column used in Example 1 was packed with 715 gms. of molecular sieve 13–X in the form of pellets $1/8$ inch in diameter by about $1/2$ inch long. The feed contained 0.61 mole percent vinyl fluoride and .09 mole percent acetylene, the balance being vinylidene fluoride. The feed was drawn vapor phase from a weighed cylinder, metered, and fed to the bottom of the adsorber which was at room temperature and about 140 mm. Hg gauge pressure. Superficial gas velocity was 0.167 feet/second. The effluent from the top of the column was analyzed chromatographically to be pure vinylidene chloride until breakthrough occurred 41 minutes after the start of the run.

Example 3

Example 1 was repeated but with a gas feed containing 23.2 mole percent of vinyl fluoride. Pure vinylidene fluoride was obtained for 34 minutes before breakthrough occured.

Example 4

An adsorption column, consisting of a 25" length of $1/4$" diameter copper tubing was filled with approximately 7.3 gms. of molecular sieve 10–X. The sieves were ground and screened, and those within 40 and 80 mesh were used for the adsorption.

Mixtures of vinyl fluoride and vinylidene fluoride containing (a) 9 mole percent, (b) 2 mole percent and (c) 0.3 mole percent were fed vapor phase through the adsorption column, with a periodic sample of the effluent being submitted for chromatographic analysis. The adsorption was carried out at room temperature and essentially atmospheric pressure and at a superficial gas velocity of about 0.085 feet/second. In each case, the effluent vinylidene fluoride was free of vinyl fluoride until break-through.

Example 5

When Example 1 is repeated but using molecular sieve 5–A, an effluent gas consisting solely of vinylidene fluoride was obtained. The efficiency of the bed was only slightly less than that of Example 1.

Example 6

A column $1/4$" O.D. and 0.5 meter long was packed with type 13–X, molecular sieve. A sample of vinylidene fluoride containing 0.3 mole percent vinyl fluoride was fed to the column at the rate of about 0.15 ft./second and of 28° C. the composition of the exit gas was monitored continually with a thermal conductivity cell. In addition, samples of the exit gas were taken in a hypodermic syringe and analyzed on a gas chromatograph. The vinylidene fluoride passed for 34.5 min. before breakthrough of vinyl fluoride occurred.

*Example 7*

A column ½" O.D. and 6 ft. long was packed with type 13–X molecular sieve. A sample of vinylidene fluoride containing about 0.4 mole percent of vinyl fluoride was fed to the column which had been previously evacuated to 0.4 mm. The purified vinylidene fluoride was trapped in a cylinder maintained at liquid nitrogen temperatures. The effluent gas was analyzed periodically for vinyl fluoride content by taking samples of the exit stream in a hypodermic syringe and analyzing them on the gas chromatograph. Pure vinylidene fluoride was trapped in the cylinder. The gas was regulated at about 0.45 ft./second at room temperature. The purification was run for about 100 minutes without break-through.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process of separating vinylidene fluoride from its admixture with vinyl fluoride, the vinyl fluoride component in said mixture being less than about 30 mole percent, said process comprising the passing of said mixture which is in a gaseous state, through a synthetic alkali metal alumina silicate characterized by a three-dimensional network with mutually connected intra-crystalline voids accessible through openings of at least 5 A. in diameter, said process being carried out at a temperature below 80° C. and a pressure below 600 p.s.i.g.

2. The process of claim 1 in which the alumina silicate has intra-crystalline voids of about 10 A. in diameter.

3. The process of claim 1 in which the alumina silicate has intra-crystalline voids of about 13 A. in diameter.

References Cited in the file of this patent

UNITED STATES PATENTS 2,843,219    Habgood              July 15, 1958

OTHER REFERENCES

Petroleum Engineer-Refining Section, February 1957, pg. C 53.